(12) United States Patent
Tautz (10) Patent No.: US 8,873,162 B2
(45) Date of Patent: Oct. 28, 2014

(54) OPTICAL SYSTEM

(75) Inventor: Volker Tautz, Wetzlar (DE)

(73) Assignee: Carl Zeiss Sports Optics GmbH, Wetzlar (DE)

( * ) Notice: Subject to any disclaimer, the term of this patent is extended or adjusted under 35 U.S.C. 154(b) by 738 days.

(21) Appl. No.: 12/586,284

(22) Filed: Sep. 18, 2009

(65) Prior Publication Data

US 2010/0134882 A1 Jun. 3, 2010

(30) Foreign Application Priority Data

Sep. 19, 2008 (DE) .......................... 10 2008 042 221

(51) Int. Cl.
*G02B 15/14* (2006.01)
*G02B 15/173* (2006.01)
*G02B 23/00* (2006.01)

(52) U.S. Cl.
CPC .............. *G02B 15/173* (2013.01); *G02B 23/00* (2013.01)
USPC ............................ 359/689; 359/399; 359/684

(58) Field of Classification Search
USPC .......... 359/690, 684, 422, 689, 685, 651, 682
See application file for complete search history.

(56) References Cited

U.S. PATENT DOCUMENTS

| | | | |
|---|---|---|---|
| 3,069,972 A | 12/1962 | Tibbetts et al. | |
| 3,286,592 A | 11/1966 | Wagner et al. | |
| 4,693,566 A | 9/1987 | Imaizumi | |
| 5,059,007 A | 10/1991 | Tanaka | |
| 5,210,646 A | 5/1993 | Mercado et al. | |
| 5,268,793 A | 12/1993 | Saka et al. | |
| 5,442,486 A * | 8/1995 | Sato ............................... | 359/690 |
| 5,717,527 A | 2/1998 | Shibayama | |
| 6,226,122 B1 | 5/2001 | Sugawara | |
| 6,226,132 B1 | 5/2001 | Abe | |
| 6,342,974 B1 * | 1/2002 | Usui ............................ | 359/687 |
| 6,512,637 B1 * | 1/2003 | Tomita ........................ | 359/686 |
| 6,563,642 B2 | 5/2003 | Sugawara | |
| 6,778,329 B2 * | 8/2004 | Ozaki .......................... | 359/684 |

(Continued)

FOREIGN PATENT DOCUMENTS

| | | |
|---|---|---|
| DE | 704 17 03 | 11/1970 |
| DE | 10 2004 001 481 A1 | 8/2005 |
| JP | 08 248314 A | 9/1996 |

OTHER PUBLICATIONS

Bass, Michael, "Handbook of Optics", 1995, XP002566220, 4 pages.

(Continued)

*Primary Examiner* — Zachary Wilkes
(74) *Attorney, Agent, or Firm* — Muirhead and Saturnelli, LLC (57) ABSTRACT

An optical system for imaging an object on an image acquisition unit has a variable focal length for zooming. The optical system has precisely three lens units from the object in the direction of an image acquisition unit, namely a first lens unit, a second lens unit, and a third lens unit. The second lens unit and the third lens unit are movably situated along an optical axis of the optical system for a change of the focal length. The first lens unit includes a first lens group and a second lens group. The first lens group of the first lens unit is fixedly situated on the optical axis of the optical system. The second lens group of the first lens unit is movably situated along the optical axis of the optical system for focusing. The second lens group includes at least two lenses.

20 Claims, 5 Drawing Sheets

(56) References Cited

U.S. PATENT DOCUMENTS

| | | | |
|---|---|---|---|
| 7,142,370 | B2 | 11/2006 | Sato |
| 7,864,445 | B2 * | 1/2011 | Shirasuna .................... 359/687 |
| 2002/0101661 | A1 | 8/2002 | Harada |
| 2006/0285224 | A1 * | 12/2006 | Endo et al. .................... 359/689 |
| 2008/0024877 | A1 | 1/2008 | Kawakami et al. |
| 2008/0204893 | A1 | 8/2008 | Jeong et al. |

OTHER PUBLICATIONS

Shannon, Robert R., "The Art and Science of optical Design", 1997, Cambridge University Press, XP002566221, 8 pages.
"Spotting Scopes—Diascope System", http://www.zeiss.de/c12567a80033f8e4/Contents-Frame/6765c34669ed4691c1256f64003b8801, (first documented update: Dec. 19, 2005), 1 Pg.
"Spotting Scopes—Diascope System—The Eyepieces", http://www.zeiss.de/c12567a80033d63e/Contents-Frame/e85d48e0c652e1fac1256f470034830c, (in German—See Ref. CC for English Translation) (First documented update: Feb. 23, 2007), 2 Pgs.
"Spotting Scopes—Diascope System—The Eyepieces", http://www.zeiss.de/c12567a80033f8e4/Contents-Frame/362ca5c693111715c1256f64003d27c3 (in English) (first documented update: May 20, 2007), 2 Pgs.
"Beobachten und Fotografieren. Gleichzeitig.", Die neue Dimension der Naturbeobachtung. Wetzlar, (in German—See Ref. CG for English Translation), Sep. 2006, 8 Pgs.
"Observe and Photograph. Simultaneously. The new dimension in nature observation.", Wetzlar, Sep. 2006, 8 Pgs.
"Die Spektive von Carl Zeiss. Diascope 65 T* FL und 85 T* FL.", Sep. 2001, 6 Pgs.
"The Spotting Scopes from Carl Zeiss. Diascope 65 T* FL and 85 T* FL.", The second version of the brochure was published in English in Chester, Virginia (USA), in Oct. 2001, 6 Pgs.
"Die Spektive von Carl Zeiss. Diascope 65 T* FL und 85 T* FL. Wetzlar" and "Die Spektive von Carl Zeiss. Diascope 65 T* FL und 85 T* FL", Sep. 2001, First Reference—12 Pgs.

\* cited by examiner

OPTICAL SYSTEM

TECHNICAL FIELD

This application relates to an optical system for imaging an object on an image acquisition unit, in particular, an optical system having a variable focal length for zooming.

BACKGROUND OF THE INVENTION

A telescope having a variable magnification is known from DE 704 17 03, which is incorporated herein by reference. The telescope has an optical system in the form of a zoom objective, a prism reversal system, and an ocular. The zoom objective is provided with four lens units, namely a first lens unit, a second lens unit, a third lens unit, and a fourth lens unit. In other words, the zoom objective is a four-number system. Two of the above-mentioned lens units, namely the second lens unit and the third lens unit, are situated so they are movable along the optical axis. In contrast, the first lens unit and the fourth lens unit are situated fixed on the optical axis. The fourth lens unit is used for implementing the main portion of the required refractive power of the objective. In principle, the fourth lens unit is a main objective, essentially having an afocal adapter having variable magnification connected upstream. The afocal adapter includes the fixed first lens unit, the movable second lens unit, and the movable third lens unit. However, the above-mentioned construction, including a main objective having an afocal adapter, has the disadvantage that a large overall objective length results in comparison to the maximum achievable focal length of the zoom objective. This is undesirable.

A telescope having an objective of variable focal length (zoom objective), a prism reversal system, and having an ocular having a fixed focal length is known from U.S. Pat. No. 3,069,972, which is incorporated herein by reference. The objective of the known telescope is constructed according to the principle of optical compensation. For this reason, only a movement along the optical axis is necessary, which is executed by a first lens unit and a second lens unit, between which a fixed third lens unit is situated. The known telescope, however, has the disadvantage because of the principle of optical compensation that the location of the image plane of the object to be imaged fluctuates over the magnification range of the telescope.

A zoom telescope is known from DE 10 2004 001 481 A1, which is incorporated herein by reference, which includes an optical system in the form of an objective of variable focal length, an ocular of fixed focal length, and a prism reversal system, the prism reversal system being situated between the objective and the ocular. The objective has a first lens unit, a second lens unit, and a third lens unit from an object in the direction of the ocular. The second lens unit and the third lens unit are situated so they are movable along the optical axis of the objective for zooming. The first lens unit of the objective includes a first lens group, which has a cemented element, and a second lens group, which only includes a single lens. If the location of the image plane of the object is to remain unchanged during zooming when finite object distances are set, focusing must be performed by moving lens units along the optical axis of the objective, these movable lens units being in front of the movable second lens unit and the movable third lens unit, which are used for changing the focal length. It is known from DE 10 2004 001 481 A1 that the setting to finite object distance is performed by displacing the entire first lens unit along the optical axis of the objective or, alternatively thereto, only by a movement of the second lens group of the first lens unit, the second lens group including a single lens. A constant field of vision is achieved by using a zoom objective and by situating a field aperture in the intermediate image after the zoom objective and/or the prism reversal system. An intermediate image having equal diameter results for all zoom settings of the zoom objective in this way. A constant subjective field of vision results after the ocular, independently of the zoom setting. However, the known telescope has the disadvantage that a displacement of the entire first lens unit to set finite object distances requires an overall length change of the objective (and thus also of the entire telescope). This can be avoided using internal focusing by sole movement of the second lens group of the first lens unit. However, because only a single lens is displaced for setting to finite object distance, the spherical aberration and the chromatic errors of the objective change very strongly. This is disadvantageous in particular for objectives having a large maximum focal length (for example, 500 mm).

An objective of an above-mentioned telescope from the prior art is typically achromatically corrected. The vertex image distances for red and blue light are thus equally long, but the vertex image distances for green light deviate. This deviation is typically referred to as a longitudinal chromatic aberration or also as a secondary spectrum. The secondary spectrum of the objective of a telescope of this type often results in color fringes at light-dark transitions. These are often very annoying to an observer who observes an object using the telescope. This interference is all the more obvious the greater the focal length of the objective and thus a magnification of the object is selected on the telescope.

An achromatic lens system is known from U.S. Pat. No. 6,226,132 B1, which is incorporated herein by reference, in which the secondary spectrum may be decreased by selecting a suitable deviating relative partial dispersion. However, the relative aperture of this known lens system is 1:10. Such a relative aperture is inadequate for use in objectives having variable focal lengths for telescopes.

Accordingly, it would be desirable to provide an optical system in which both the spherical aberration and also the Gaussian error are corrected sufficiently and in which the overall length does not change.

SUMMARY OF THE INVENTION

According to the system described herein, an optical system is provided for imaging an object on an image acquisition unit. The image acquisition unit may be understood to include a wide range of suitable units for image acquisition in accordance with the system described herein. The optical system may be implemented as an objective for a telescope. In an embodiment, the magnification range of the telescope may be from 15× to 45× or from 20× to 60×, for example. Where the optical system is implemented as an objective of a telescope, the image acquisition unit may be the retina of an observer, for example. However, embodiments of the system described herein may also be provided in which the optical system according to the system described herein is implemented for imaging an object on an image acquisition unit in the form of a surface sensor, such as a charge-coupled device (CCD) and/or a complementary metal oxide semiconductor (CMOS) sensor, among other suitable image acquisition unit designs.

The optical system according to an embodiment of the system described herein may have precisely three lens units from the object in the direction of an image acquisition unit, namely a first lens unit, a second lens unit, and a third lens unit. A lens unit may be understood herein as a single lens or also as a lens unit assembled from multiple lenses. The second lens unit and the third lens unit may be situated so they are movable along an optical axis of the optical system for a change of the focal length (zooming). The first lens unit may include a first lens group and a second lens group. A lens group may be understood as a single lens or also as a lens group assembled from multiple lenses. Further lens groups may not be provided in the first lens unit. The first lens group of the first lens unit may be situated so it is stationary on the optical axis of the optical system. It may, accordingly, be fixed. The second lens group of the first lens unit may be situated so it is movable along the optical axis of the optical system for focusing, however. The second lens group may include at least two lenses.

Considerations have shown that a sufficient correction of the spherical aberration and the Gaussian error may be achieved by the above-mentioned optical system. In addition, the optical system may have a fixed overall length. In particular, the first lens unit may have a telephoto effect, which results in a shortened overall length of the optical system relative to the maximum focal length of the optical system. In addition, only lenses of the first lens unit may be implemented having the free diameter as large as the entry pupil diameter of the optical system. All other lenses may have a free diameter which is significantly smaller. Furthermore, it is possible that through a suitable selection of the focal lengths of the individual lens units, the maximum focal length of the optical system may be implemented substantially solely by the first lens unit. The second lens unit and the third lens unit may form a zoom system downstream from the first lens unit for reducing the focal length. Through this construction, a reduction of the secondary spectrum is made possible, in particular at the maximum focal length of the optical system. This construction may also have a favorable effect on the overall length of the optical system. Furthermore, considerations have shown that the relative aperture of the optical system at a maximum focal length may be at least 1:5.9.

In an embodiment of the system described herein, the first lens unit may be implemented as a converging first lens unit. The second lens unit may in turn be implemented as a dispersive second lens unit. The third lens unit may be implemented as a converging third lens unit.

In a further embodiment, the first lens group of the first lens unit may be implemented as a converging first lens group, while, in contrast, the second lens group of the first lens unit may be implemented as a dispersive second lens group.

In turn, it is provided in a further embodiment of the system described herein that the first lens group may have a first lens implemented as a converging lens, a second lens implemented as a converging lens, and a third lens implemented as a dispersive lens. The second lens group in turn may have a fourth lens implemented as a converging lens and a fifth lens implemented as a dispersive lens. In addition, the second lens group may be implemented as a cemented element.

In a further embodiment of the optical system according to the system described herein, the second lens unit may also be assembled from multiple lenses. It is thus provided that the second lens unit may have a sixth lens implemented as a dispersive lens, a seventh lens implemented as a dispersive lens, and an eighth lens implemented as a converging lens. In addition, it may be provided that the seventh lens and the eighth lens form a dispersive cemented element.

The third lens unit may also have multiple lenses in a further embodiment. Thus, the third lens unit may have a ninth lens implemented as a converging lens, a tenth lens implemented as a dispersive lens, an eleventh lens implemented as a converging lens, a twelfth lens implemented as a converging lens, and a thirteenth lens implemented as a dispersive lens. In a further embodiment, it is provided that the twelfth lens and the thirteenth lens may form a dispersive cemented element.

To further reduce the secondary spectrum, it is provided in a further embodiment of the optical system according to the system described herein that the second lens may be manufactured from a material whose deviation of the relative partial dispersion fulfills the following condition:

$$\Delta\theta_{gF} > 0.025 \quad \text{(condition 1)}.$$

The third lens may be manufactured from a material whose deviation of the relative partial dispersion fulfills the following condition:

$$\Delta\theta_{gF} < -0.005 \quad \text{(condition 2)}.$$

The fifth lens may also be manufactured from a material whose deviation of the relative partial dispersion fulfills the following condition:

$$\Delta\theta_{gF} < -0.005 \quad \text{(condition 3)}.$$

The eleventh lens may also be manufactured from a material whose deviation of the relative partial dispersion fulfills the following condition:

$$\Delta\theta_{gF} > 0.004 \quad \text{(condition 4)}.$$

The twelfth lens may in turn be manufactured from a material whose deviation of the relative partial dispersion fulfills the following condition:

$$\Delta\theta_{gF} 0.004 \quad \text{(condition 5)}.$$

Furthermore, it is provided that the thirteenth lens may be manufactured from a material whose deviation of the relative partial dispersion fulfills the following condition:

$$\Delta\theta_{gF} < -0.005 \quad \text{(condition 6)}.$$

$\Delta\theta_{gF}$ describes the deviation of the relative partial dispersion in regard to the g-line and the F-line from a normal line which is provided by two reference glasses. In the case of the system described herein, these may be the glasses NSL7 and PHM2 from the OHARA company. The deviation of the relative partial dispersion from this normal line may be determined from the following formula:

$$\Delta\theta_{gF} = \frac{(n_g - n_F)}{(n_F - n_C)} - (0.6415 - 0.001618 \times \nu_d)$$

$n_g$ being the index of refraction for the g-line, $n_F$ being the index of refraction for the F-line, and $n_C$ being the index of refraction for the C-line. $\nu_d$ is the Abbe number for the d-line. The corresponding dimensions may be taken from the catalogs of the manufacturers of optical glasses for lens units.

In a further embodiment of the optical system according to the system described herein, the first lens unit, the second lens unit, and the third lens unit, and the first lens, second lens, third lens, fourth lens, fifth lens, sixth lens, seventh lens, eighth lens, ninth lens, tenth lens, eleventh lens, twelfth lens, and thirteenth lens contained in the above-mentioned lens units may have the following properties:

TABLE 1

| Face | Radii | Distances [mm] | $n_e$ | $v_e$ | $\Delta\theta_{gF}$ | Glass |
|---|---|---|---|---|---|---|
| First face of the first lens | 193.452 | 8.800 | 1.489150 | 70.2 | 0.0022 | S-FSL5 |
| Second face of the first lens | −461.963 | 0.300 | | | | |
| First face of the second lens | 133.330 | 13.800 | 1.498450 | 81.1 | 0.0280 | S-FPL51 |
| Second face of the second lens | −203.627 | 1.300 | | | | |
| First face of the third lens | −199.963 | 4.300 | 1.616690 | 44.0 | −0.0065 | S-NBM51 |
| Second face of the third lens | 199.963 | 89.054 | | | | |
| First face of the fourth lens | 172.546 | 8.400 | 1.624090 | 33.5 | 0.0070 | S-TIM2 |
| First face of the fifth lens | −60.561 | 2.400 | 1.616690 | 44.0 | −0.0065 | S-NBM51 |
| Second face of the fifth lens | 76.744 | D9 | | | | |
| First face of the sixth lens | 8008.430 | 2.300 | 1.489150 | 70.2 | 0.0022 | S-FSL5 |
| Second face of the sixth lens | 97.756 | 5.000 | | | | |
| First face of the seventh lens | −107.668 | 2.000 | 1.732340 | 54.4 | −0.0086 | S-LAL18 |
| First face of the eighth lens | 68.366 | 5.000 | 1.812640 | 25.2 | 0.0158 | S-TIH6 |
| Second face of the eighth lens | 346.508 | D14 | | | | |
| First face of the ninth lens | 116.707 | 5.000 | 1.591430 | 60.6 | −0.0018 | S-BAL35 |
| Second face of the ninth lens | −150.657 | 6.000 | | | | |
| First face of the tenth lens | −45.364 | 3.500 | 1.761670 | 27.3 | 0.0133 | S-TIH4 |
| Second face of the tenth lens | −59.427 | 0.500 | | | | |
| First face of the eleventh lens | 65.995 | 5.000 | 1.620330 | 63.0 | 0.0051 | S-PHM52 |
| Second face of the eleventh lens | −202.293 | 0.500 | | | | |
| First face of the twelfth lens | 54.889 | 5.500 | 1.620330 | 63.0 | 0.0051 | S-PHM52 |
| First face of the thirteenth lens | −223.543 | 2.000 | 1.616690 | 44.0 | −0.0065 | S-NBM51 |
| Second face of the thirteenth lens | 31.631 | D23GBE | | | | |

TABLE 2

| f' [mm] | 167.3 | 334.6 | 501.9 |
|---|---|---|---|
| D9 [mm] | 35.773 | 76.325 | 119.468 |
| D14 [mm] | 101.408 | 42.598 | 13.255 |
| D23GBE [mm] | 110.217 | 128.476 | 114.676 |
| Entrance pupil diameter [mm] | 38.44 | 65.3 | 85.0 |
| Relative aperture | 1:4.4 | 1:5.1 | 1:5.9 |
| 2 * Sigma | 4.5° | 2.25° | 1.5° |

TABLE 3

| | |
|---|---|
| Focal length first lens unit [mm] | 502.73 |
| Focal length first lens group [mm] | 251.95 |
| Focal length second lens group [mm] | −243.67 |
| Focal length second lens unit [mm] | −75.78 |
| Focal length third lens unit [mm] | 82.14 |

The individual faces of the lenses and their radii are specified in the above-mentioned Table 1. Furthermore, the distance of the vertex of a first face to the vertex of the proximal face is specified. This also indicates the thickness of the individual lenses. Furthermore, the index of refraction is identified by $n_e$ and the Abbe number is identified by $v_e$ in Table 1. In addition, the type of glass of the particular lenses is specified, the notation of the types of glass relating to types of glass of the OHARA company. The distances identified by D9, D14, and D23 GBE are variable distances which are selected as a function of the desired focal length. Examples of these distances at various focal lengths of the optical system are specified in Table 2. D23 GBE is the distance up to the paraxial image plane (Gaussian image plane GBE) without a prism glass pathway. Furthermore, the diameter of the entry pupil of the optical system, the relative aperture, and the angle aperture for the corresponding focal lengths are specified in Table 2.

Table 3 specifies the individual focal lengths of the first lens unit, the second lens unit, and the third lens unit for the above-noted embodiment of the optical system according to the system described herein. Furthermore, the individual focal lengths of the first lens group and the second lens group of the first lens unit are specified.

In a further embodiment of the optical system according to the system described herein, it is provided that the radii and distances may be variable within ±10% and the indices of refraction $n_e$ and the Abbe numbers $v_e$ may be variable within ±5%.

The system described herein also relates to a telescope which is implemented having an optical system which has at least one of the above-mentioned features or one of the above-mentioned feature combinations. In this telescope, the optical system may be implemented as an objective. Furthermore, the telescope may be implemented having at least one image acquisition unit. The system described herein may be used in a spotting scope, for example.

In an embodiment of the telescope according to the system described herein, the telescope may have an image acquisition unit in the form of a surface sensor, such as a CCD and/or a CMOS sensor. Alternatively thereto, an image acquisition unit may be provided in the form of an ocular, using which an image of an object is imaged on the retina of an observer. In a further embodiment, for example, both a surface sensor and also an ocular may be provided. A telescope according to this embodiment may allow for both observation of the object (retina) and also imaging of the object on a surface sensor simultaneously.

In a further embodiment of the telescope according to the system described herein, a prism reversal system may be provided, which can be implemented as a deflection prism to shorten the overall length. Additionally or alternatively thereto, the prism reversal system may be implemented as a beam splitter, one portion of the beam being conducted to the ocular and another portion to the surface sensor.

A telescope is known from the prior art which has an ocular having variable focal lengths. In contrast, the ocular may have a fixed focal length in an embodiment of the telescope according to the system described herein. In contrast to the prior art, in which the subjective (eye-side) field of vision rises from 49° to 68° from lower to higher magnification, for example, in the telescope according to the system described herein, which may have a zoom objective, the field of vision may be constant over the entire magnification range. The large subjective field of vision may thus be already provided at a low magnification, which may be first achieved in a telescope having an ocular having variable focal length at a high or maximum magnification.

BRIEF DESCRIPTION OF THE DRAWINGS

Embodiments of the system described herein are explained in greater detail below based on the figures, which are briefly described as follows.

DETAILED DESCRIPTION OF VARIOUS EMBODIMENTS

Figures 1A, 1B:
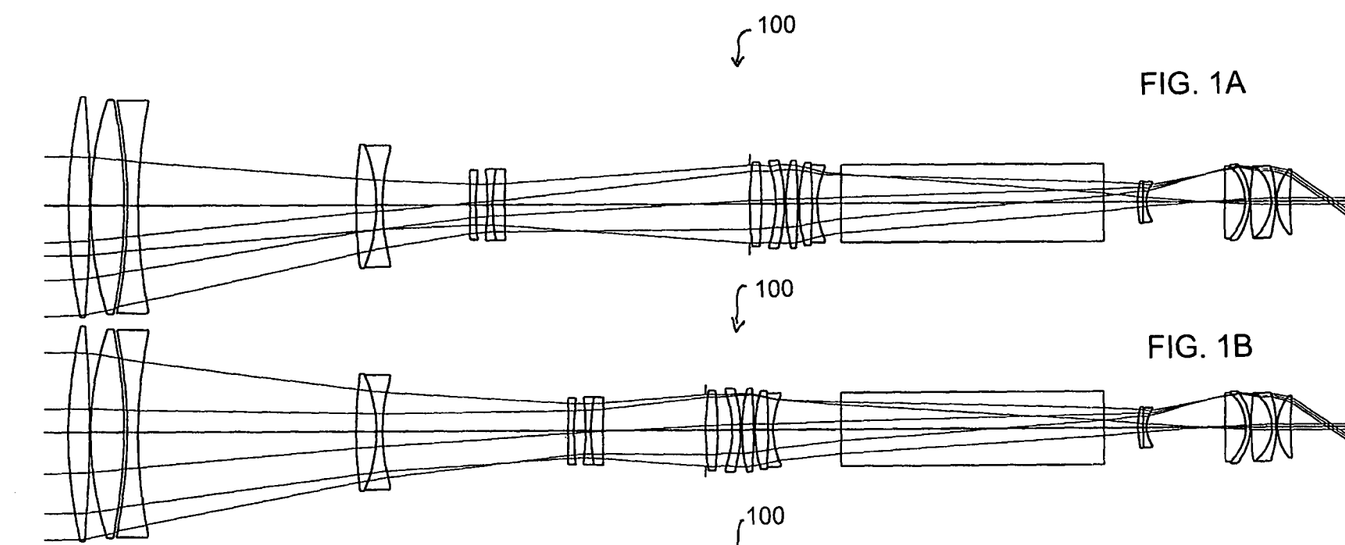
FIGS. 1A-1C show a schematic illustration in the form of a lens section of a telescope having an optical system according to an embodiment of the system described herein.
Figure 1C:
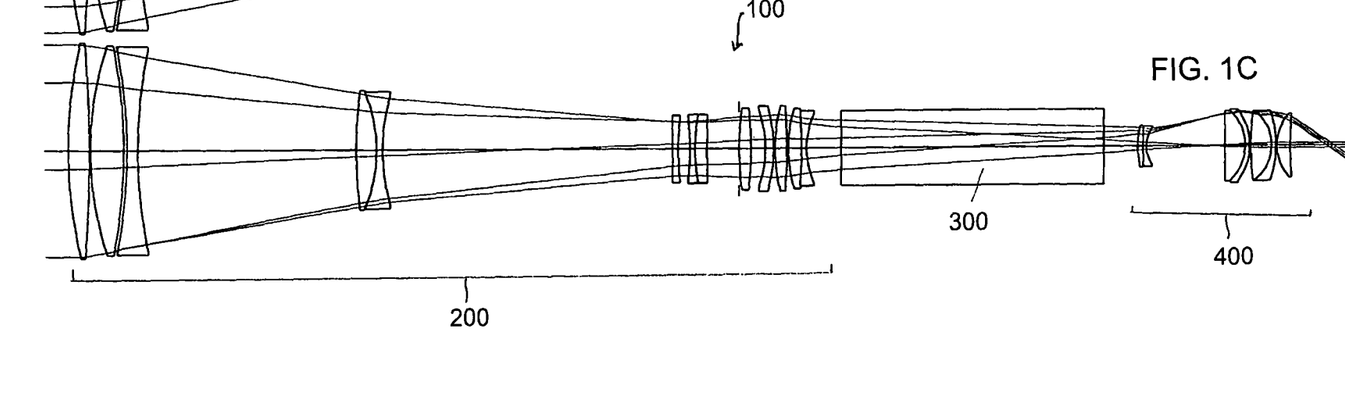

FIGS. 1A through 1C show a schematic illustration of a embodiment of a telescope 100 according to the system described herein. The telescope 100 may include an optical system in the form of an objective 200, a prism reversal system 300, and an ocular 400. The prism reversal system 300 may additionally be implemented as a beam splitter for dividing incident beams into two partial beam paths. FIGS. 1A through 1C show various settings of the individual optical units of the telescope 100, i.e., the objective 200, in which various magnifications may be achieved. This is discussed in greater detail below.

The objective 200 may have a variable focal length. For example, the objective 200 may be designed for a focal length range from approximately 166.7 mm to approximately 500 mm. For example, if the ocular 400 having a focal length of approximately 11.1 mm is selected, the telescope 100 will have a variable magnification from approximately 15× to approximately 45×. However, if ocular 400 having a focal length of approximately 8.3 mm is selected, the magnification range of the telescope 100 is approximately 20× to approximately 60×. The field of vision of an observer may be constant over the entire above-mentioned magnification range and is 68°, for example.

Figure 2A:
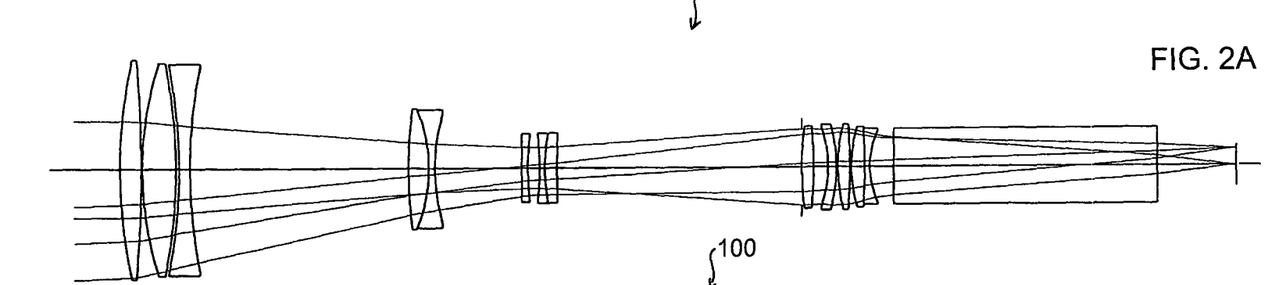
FIGS. 2A-2C show a schematic illustration of the embodiment according to FIG. 1, only the optical system and a prism reversal system being shown.
Figure 2B:
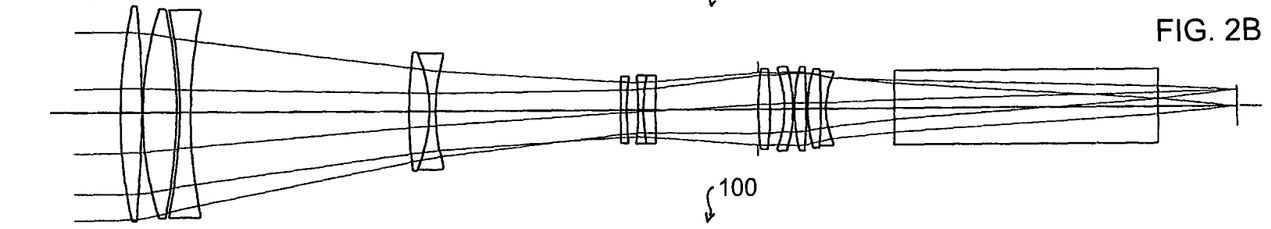
Figure 2C:
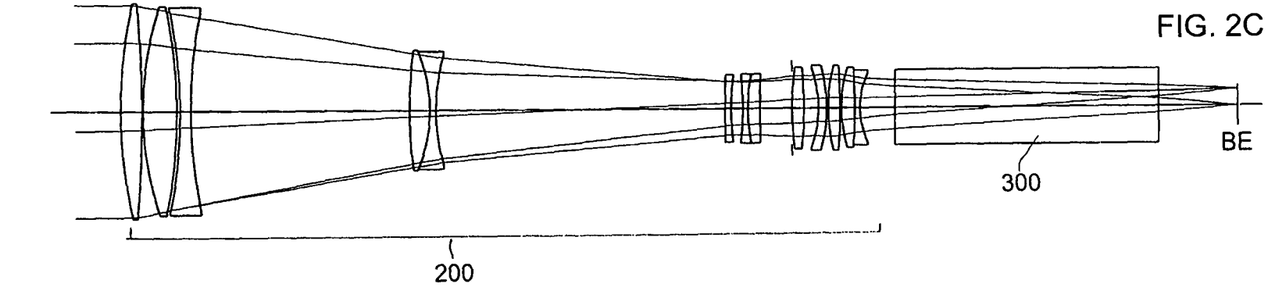

FIGS. 2A through 2C show a further schematic illustration of telescope 100 according to FIGS. 1A through 1C. However, only a partial section of telescope 100 is shown, namely the area of the objective 200 and the prism reversal system 300. Furthermore, the image plane of an object to be imaged is shown, which is identified by letter combination BE. Settings of the individual optical units of objective 200 are shown at a minimal focal length (FIG. 2A), at a moderate focal length (FIG. 2B), and at a maximal focal length (FIG. 2C). The setting of the focal length and focusing may be performed by movements of optical units of the objective 200, which are explained in greater detail below on the basis of FIG. 3.

Figure 3:
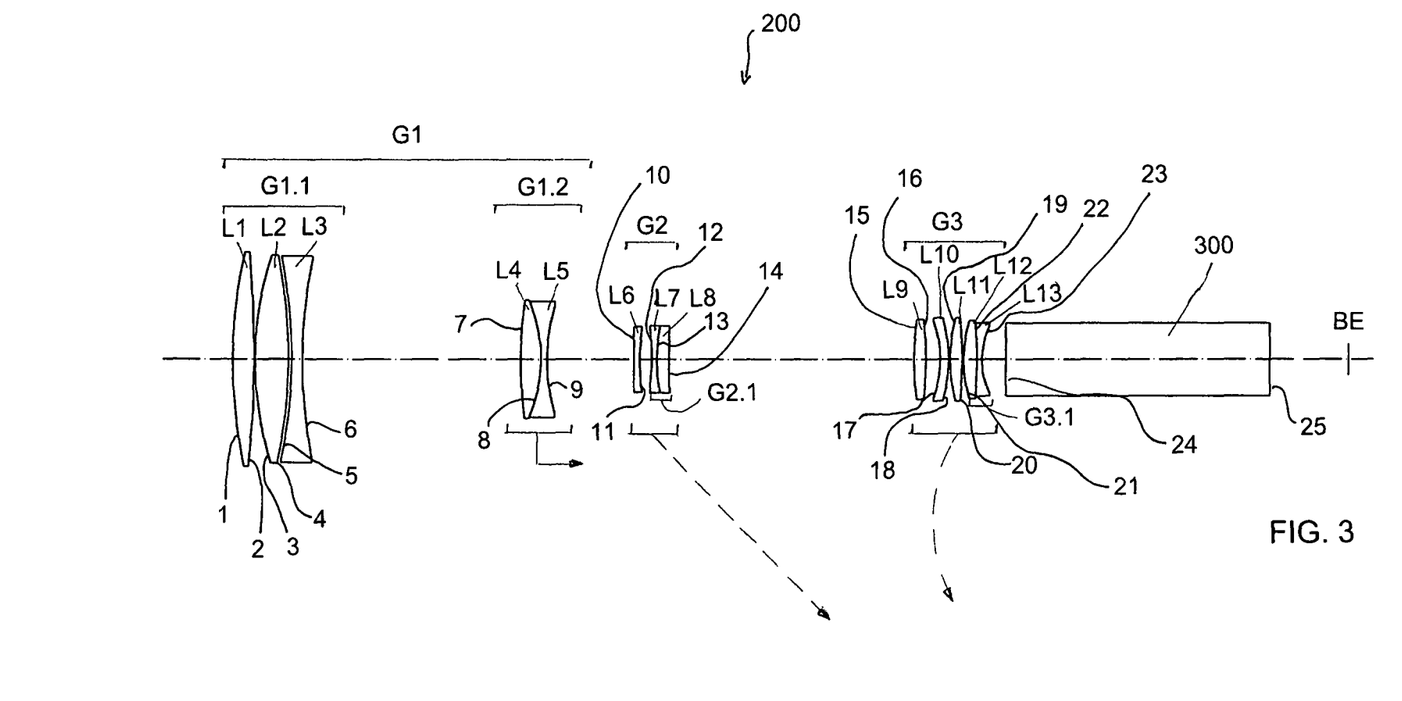
FIG. 3 shows a schematic illustration of the optical system according to FIGS. 1 and 2 in a setting for minimal focal length.

As FIG. 3 shows, the objective 200 may have a first lens unit G1, a second lens unit G2, and a third lens unit G3 from the object to be imaged in the direction of an image acquisition unit in the form of a retina of an observer (not shown) or in the direction of the ocular 400. The first lens unit G1 may be implemented as a converging first lens unit, while the second lens unit G2 may be implemented as a dispersive second lens unit. The third lens unit G3 may in turn be implemented as a converging third lens unit.

The first lens unit G1 may have a first lens group G1.1 and a second lens group G1.2. The first lens group G1.1 may include a first lens L1, implemented as a converging lens, a second lens L2, implemented as a converging lens, and a third lens L3, implemented as a dispersive lens, from the object in the direction of the image acquisition unit. The second lens group G1.2 may have a fourth lens L4 implemented as a converging lens and a fifth lens L5 implemented as a dispersive lens. The fourth lens L4 and the fifth lens L5 may form a cemented element. The first lens group G1.1 may be situated fixed on the optical axis of the objective 200. It is therefore not moved. The second lens group G1.2, however, may be situated as movable in regard to the optical axis of the objective 200 for focusing.

The second lens unit G2 may have a sixth lens L6 implemented as a dispersive lens, a seventh lens L7 implemented as a dispersive lens, and an eighth lens L8 implemented as a converging lens. The seventh lens L7 and the eighth lens L8 may form a cemented element, which may be implemented as a dispersive element G 2.1.

The third lens unit G3 may in turn have a ninth lens L9 implemented as a converging lens, a tenth lens L10 implemented as a dispersive lens, an eleventh lens L11 implemented as a converging lens, and a dispersive element G 3.1, which may be formed from a twelfth lens L12 implemented as a converging lens and a thirteenth lens L13 implemented as a dispersive lens. The dispersive element G3.1 may be implemented as a cemented element.

Both second lens unit G2 and also third lens unit G3 are implemented as movable on the optical axis of objective 200 for the focal length change (zooming).

The properties of individual lens units G1 through G3 and their lenses L1 through L13 are specified below in tables:

TABLE 4

| Face | Radii | Distances [mm] | $n_e$ | $v_e$ | $\Delta\theta_{gF}$ | Glass |
|---|---|---|---|---|---|---|
| 1 | 193.452 | 8.800 | 1.489150 | 70.2 | 0.0022 | S-FSL5 |
| 2 | −461.963 | 0.300 | | | | |
| 3 | 133.330 | 13.800 | 1.498450 | 81.1 | 0.0280 | S-FPL51 |
| 4 | −203.627 | 1.300 | | | | |

TABLE 4-continued

| Face | Radii | Distances [mm] | $n_e$ | $v_e$ | $\Delta\theta_{gF}$ | Glass |
|---|---|---|---|---|---|---|
| 5 | −199.963 | 4.300 | 1.616690 | 44.0 | −0.0065 | S-NBM51 |
| 6 | 199.963 | 89.054 | | | | |
| 7 | 172.546 | 8.400 | 1.624090 | 33.5 | 0.0070 | S-TIM2 |
| 8 | −60.561 | 2.400 | 1.616690 | 44.0 | −0.0065 | S-NBM51 |
| 9 | 76.744 | D9 | | | | |
| 10 | 8008.430 | 2.300 | 1.489150 | 70.2 | 0.0022 | S-FSL5 |
| 11 | 97.756 | 5.000 | | | | |
| 12 | −107.668 | 2.000 | 1.732340 | 54.4 | −0.0086 | S-LAL18 |
| 13 | 68.366 | 5.000 | 1.812640 | 25.2 | 0.0158 | S-TIH6 |
| 14 | 346.508 | D14 | | | | |
| 15 | 116.707 | 5.000 | 1.591430 | 60.6 | −0.0018 | S-BAL35 |
| 16 | −150.657 | 6.000 | | | | |
| 17 | −45.364 | 3.500 | 1.761670 | 27.3 | 0.0133 | S-TIH4 |
| 18 | −59.427 | 0.500 | | | | |
| 19 | 65.995 | 5.000 | 1.620330 | 63.0 | 0.0051 | S-PHM52 |
| 20 | −202.293 | 0.500 | | | | |
| 21 | 54.889 | 5.500 | 1.620330 | 63.0 | 0.0051 | S-PHM52 |
| 22 | −223.543 | 2.000 | 1.616690 | 44.0 | −0.0065 | S-NBM51 |
| 23 | 31.631 | D23 | | | | |
| 24 | Infinite | 107.254 | 1.571250 | 55.7 | | N-BaK4 |
| 25 | Infinite | 31.994 | | | | |
| 26 | Infinite | | | | | |

TABLE 5

| f' [mm] | 167.3 | 334.6 | 501.9 |
|---|---|---|---|
| D9 [mm] | 35.773 | 76.325 | 119.468 |
| D14 [mm] | 101.408 | 42.598 | 13.255 |
| D23 [mm] | 9.961 | 28.221 | 14.421 |
| Entrance pupil diameter [mm] | 38.44 | 65.3 | 85.0 |
| Relative aperture | 1:4.4 | 1:5.1 | 1:5.9 |
| 2 * Sigma | 4.5° | 2.25° | 1.5° |

TABLE 6

| Focal length first lens unit G1 [mm] | 502.73 |
|---|---|
| Focal length first lens group G1.1 [mm] | 251.95 |
| Focal length second lens group G1.2 [mm] | −243.67 |
| Focal length second lens unit G2 [mm] | −75.78 |
| Focal length third lens unit G3 [mm] | 82.14 |

The individual faces of lenses L1 through L13 result from Table 4. Furthermore, the radii of the individual faces are specified. In addition, the distance of the vertex of a first face to the vertex of the next face is specified. This also indicates the thickness of individual lenses L1 through L13. Face 26 is the position of the image plane. Because some lenses are situated so they are movable—as noted above—variable distances are specified in the table. These are the distances identified by D9, D14, and D23. The above-mentioned distances are selected depending on the desired focal length of objective 200. Exemplary dimensions are specified in Table 5. Furthermore, the corresponding diameter of the entry pupil, the relative apertures, and the angle apertures at the corresponding focal lengths are specified.

In this embodiment, the first lens unit G1 (including the first lens group G1.1 and the second lens group G1.2), the second lens unit G2, and the third lens unit G3 have specific focal lengths, which are shown in Table 6.

Through the selection of the focal lengths for the first lens unit G1, the second lens unit G2, and the third lens unit G3, the maximum focal length of the objective 200 may already be approximately provided solely using the first lens unit G1. The second lens unit G2 and the third lens unit G3 may act as a zoom system downstream from the first lens unit G1 for reducing the focal length.

The above-mentioned construction may make the desired reduction of the secondary spectrum easier, in particular at the maximum focal length of the objective 200. Furthermore, the above-mentioned construction may have a favorable effect on the overall objective length, which is not excessive.

To reduce the secondary spectrum, in particular at a maximum focal length of the objective 200 of f'=502 mm, the lenses L1 through L13 may fulfill the above-mentioned conditions 1 through 6. The correction of the longitudinal chromatic error has not been brought precisely to apochromatic correction in the discussed embodiment, upon which the vertex distance may be equal for three wavelengths. Rather, an achromatic correction may be achieved, upon which the vertex distance may be equal for two wavelengths and the secondary spectrum may be greatly reduced. Through the use of the corresponding fourth lenses L4 and fifth lens L5 in second lens group G1.2 in connection with the further design data according to Tables 4 through 6, a good correction of the spherical aberration and the Gaussian error may be achieved, in particular at the maximum focal length of the objective 200.

In the embodiment discussed above, the first lens L1 may not be formed from glass which has a deviating relative partial dispersion. Glasses having a deviating relative partial dispersion are often more sensitive than other glasses, so that glasses having a deviating relative partial dispersion are not very well suited for protecting the other lenses. For this reason, the first lens L1 may be formed from a somewhat less sensitive material.

Figure 4:
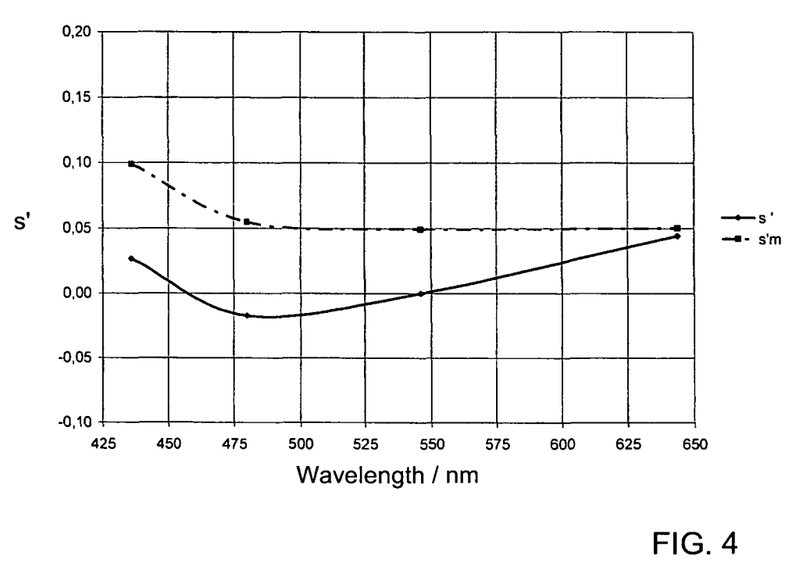
FIG. 4 shows a diagram in regard to the longitudinal chromatic error (secondary spectrum) for the optical system according to FIGS. 1C and 2C.

FIG. 4 shows a diagram in regard to the paraxial longitudinal chromatic error (secondary spectrum) for the objective 200 according to FIGS. 1C and 2C at a maximum focal length of the objective 200 of f'=502 mm. The paraxial longitudinal chromatic error s' and longitudinal chromatic error s'm up to the best collection plane at the particular wavelength (nm) are shown. The difference between curves s' and s'm may result from the spherical aberration and the Gaussian error. s'm influences the vertex distance according to which the image is focused. It is clear that the longitudinal chromatic error s' is low.

Figure 5:
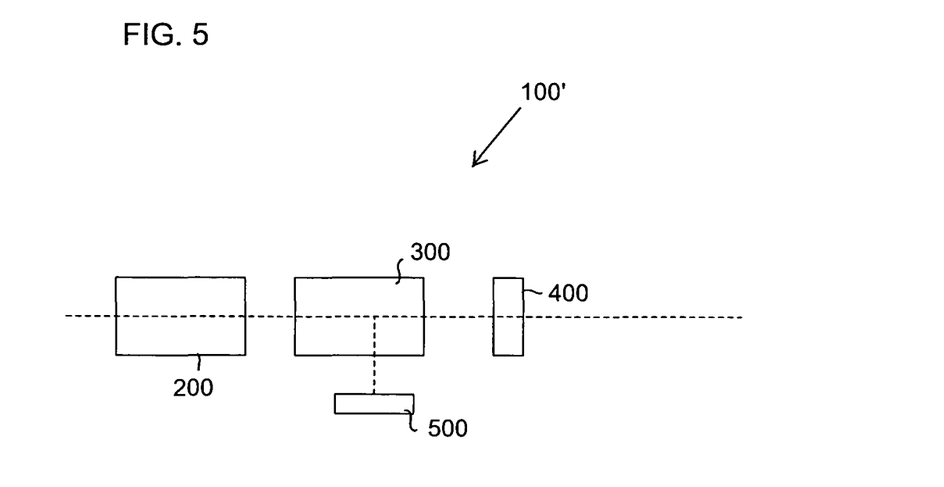
FIG. 5 shows a schematic illustration of a further optical system in the form of a telescope according to another embodiment of the system described herein.

FIG. 5 shows a schematic illustration of a telescope 100' according to another embodiment of the system described herein, which may also be provided with the objective 200 discussed above, the prism reversal system 300 discussed above, and the ocular 400 discussed above. In addition, the telescope 100' may have an image acquisition unit in the form of a surface sensor 500, such as a CCD and/or a CMOS sensor. The prism reversal system 300 may be implemented as a beam splitter, so that a portion of the incident beams are conducted to the ocular 400 and another portion of the incident light is conducted to the surface sensor 500. This telescope 100' may thus allow both an observation of the object (retina) and also imaging of the object on the surface sensor 500 simultaneously.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. An optical system for imaging an object on an image acquisition unit, comprising:
only three lens units disposed from the object in the direction of the image acquisition unit, namely a first lens unit, a second lens unit, and a third lens unit,
wherein the second lens unit and the third lens unit are movably situated along an optical axis of the optical system for zooming,
wherein the first lens unit includes a first lens group and a second lens group only, the first lens group of the first lens unit being fixedly situated on the optical axis of the optical system, and the second lens group of the first lens unit being movably situated along the optical axis of the optical system for focusing,
wherein the first lens group includes at least three lenses, the second lens group includes at least two lenses, and wherein the image acquisition unit is a surface sensor.

2. The optical system as recited in claim 1, wherein the first lens unit is a converging first lens unit, wherein the second lens unit is a dispersive second lens unit, and wherein the third lens unit is a converging third lens unit.

3. The optical system as recited in claim 1, wherein the surface sensor is at least one of: a charge-coupled device (CCD) and a complementary metal oxide semiconductor (CMOS) sensor.

4. An optical system for imaging an object on an image acquisition unit, comprising:
only three lens units disposed from the object in the direction of the image acquisition unit, namely a first lens unit, a second lens unit, and a third lens unit,
wherein the second lens unit and the third lens unit are movably situated along an optical axis of the optical system for zooming,
wherein the first lens unit includes a first lens group and a second lens group only, the first lens group of the first lens unit being fixedly situated on the optical axis of the optical system, and the second lens group of the first lens unit being movably situated along the optical axis of the optical system for focusing,
wherein the first lens group includes at least three lenses,
wherein the second lens group includes at least two lenses,
wherein the first lens group of the first lens unit is a converging first lens group, and
wherein the second lens group of the first lens unit is a dispersive second lens group.

5. The telescope as recited in claim 4, wherein the at least one image acquisition unit is an ocular.

6. An optical system for imaging an object on an image acquisition unit, comprising:
only three lens units disposed from the object in the direction of the image acquisition unit, namely a first lens unit, a second lens unit, and a third lens unit,
wherein the second lens unit and the third lens unit are movably situated along an optical axis of the optical system for zooming,
wherein the first lens unit includes a first lens group and a second lens group only, the first lens group of the first lens unit being fixedly situated on the optical axis of the optical system, and the second lens group of the first lens unit being movably situated along the optical axis of the optical system for focusing,
wherein the first lens group includes at least three lenses,
wherein the second lens group includes at least two lenses,
wherein the first lens group of the first lens unit includes:
a first lens that is a converging lens;
a second lens that is a converging lens; and
a third lens that is a dispersive lens,
and wherein the second lens group of the first lens unit includes:
a fourth lens that is a converging lens; and
a fifth lens that is a dispersive lens.

7. The optical system as recited in claim 6, wherein the second lens group is a cemented element.

8. The optical system as recited in claim 6, wherein the second lens unit includes:
   a sixth lens that is a dispersive lens;
   a seventh lens that is a dispersive lens; and
   an eighth lens that is a converging lens.

9. The optical system as recited in claim 8, wherein the seventh lens and the eighth lens form a dispersive cemented element.

10. The optical system as recited in claim 6, wherein the third lens unit includes:
    a ninth lens that is a converging lens;
    a tenth lens that is a dispersive lens;
    an eleventh lens that is a converging lens;
    a twelfth lens that is a converging lens; and
    a thirteenth lens that is a dispersive lens.

11. An optical system for imaging an object on an image acquisition unit, comprising:
    three lens units disposed from the object in the direction of the image acquisition unit, namely a first lens unit, a second lens unit, and a third lens unit,
    wherein the second lens unit and the third lens unit are movably situated along an optical axis of the optical system for zooming,
    wherein the first lens unit includes a first lens group and a second lens group, the first lens group of the first lens unit being fixedly situated on the optical axis of the optical system, and the second lens group of the first lens unit being movably situated along the optical axis of the optical system for focusing,
    wherein the second lens group includes at least two lenses,
    wherein the third lens unit includes:
       a ninth lens that is a converging lens;
       a tenth lens that is a dispersive lens;
       an eleventh lens that is a converging lens;
       a twelfth lens that is a converging lens; and
       a thirteenth lens that is a dispersive lens, and
    wherein the twelfth lens and the thirteenth lens form a dispersive cemented element.

12. An optical system for imaging an object on an image acquisition unit, comprising:
    three lens units disposed from the object in the direction of the image acquisition unit, namely a first lens unit, a second lens unit, and a third lens unit,
    wherein the second lens unit and the third lens unit are movably situated along an optical axis of the optical system for zooming,
    wherein the first lens unit includes a first lens group and a second lens group, the first lens group of the first lens unit being fixedly situated on the optical axis of the optical system, and the second lens group of the first lens unit being movably situated along the optical axis of the optical system for focusing,
    wherein the second lens group includes at least two lenses,
    wherein the first lens group of the first lens unit includes:
       a first lens that is a converging lens;
       a second lens that is a converging lens; and
       a third lens that is a dispersive lens,
    wherein the second lens group of the first lens unit includes:
       a fourth lens that is a converging lens; and
       a fifth lens that is a dispersive lens,
    wherein the second lens unit includes:
       a sixth lens that is a dispersive lens;
       a seventh lens that is a dispersive lens; and
       an eighth lens that is a converging lens,
    and wherein the third lens unit includes:
       a ninth lens that is a converging lens;
       a tenth lens that is a dispersive lens;
       an eleventh lens that is a converging lens;
       a twelfth lens that is a converging lens; and
       a thirteenth lens that is a dispersive lens.

13. The optical system as recited in claim 12,
    wherein the second lens is manufactured from a material whose deviation of the relative partial dispersion fulfills the following condition:

$\Delta\theta_{gF} > 0.025$, wherein the third lens is manufactured from a material whose deviation of the relative partial dispersion fulfills the following condition:

$\Delta\theta_{gF} < -0.005$, wherein the fifth lens is manufactured from a material whose deviation of the relative partial dispersion fulfills the following condition:

$\Delta\theta_{gF} < -0.005$, wherein the eleventh lens is manufactured from a material whose deviation of the relative partial dispersion fulfills the following condition:

$\Delta\theta_{gF} > 0.004$, wherein the twelfth lens is manufactured from a material whose deviation of the relative partial dispersion fulfills the following condition:

$\Delta\theta_{gF} > 0.004$, and wherein the thirteenth lens is manufactured from a material whose deviation of the relative partial dispersion fulfills the following condition:

$\Delta\theta_{gF} > -0.005$.

14. The optical system as recited in claim 12, wherein the first lens unit the second lens unit, and the third lens unit, and the first lens, the second lens, the third lens, the fourth lens, the fifth lens, the sixth lens, the seventh lens, the eighth lens, the ninth lens, the tenth lens, the eleventh lens, the twelfth lens, and the thirteenth lens have the following properties:

| Face | Radii | Distances [mm] | $n_e$ | $v_e$ | $\Delta\theta_{gF}$ | Glass |
|---|---|---|---|---|---|---|
| First face of the first lens | 193.452 | 8.800 | 1.489150 | 70.2 | 0.0022 | S-FSL5 |
| Second face of the first lens | −461.963 | 0.300 | | | | |
| First face of the second lens | 133.330 | 13.800 | 1.498450 | 81.1 | 0.0280 | S-FPL51 |

-continued

| Face | Radii | Distances [mm] | $n_e$ | $v_e$ | $\Delta\theta_{gF}$ | Glass |
|---|---|---|---|---|---|---|
| Second face of the second lens | −203.627 | 1.300 | | | | |
| First face of the third lens | −199.963 | 4.300 | 1.616690 | 44.0 | −0.0065 | S-NBM51 |
| Second face of the third lens | 199.963 | 89.054 | | | | |
| First face of the fourth lens | 172.546 | 8.400 | 1.624090 | 33.5 | 0.0070 | S-TIM2 |
| First face of the fifth lens | −60.561 | 2.400 | 1.616690 | 44.0 | −0.0065 | S-NBM51 |
| Second face of the fifth lens | 76.744 | D9 | | | | |
| First face of the sixth lens | 8008.430 | 2.300 | 1.489150 | 70.2 | 0.0022 | S-FSL5 |
| Second face of the sixth lens | 97.756 | 5.000 | | | | |
| First face of the seventh lens | −107.668 | 2.000 | 1.732340 | 54.4 | −0.0086 | S-LAL18 |
| First face of the eighth lens | 68.366 | 5.000 | 1.812640 | 25.2 | 0.0158 | S-TIH6 |
| Second face of the eighth lens | 346.508 | D14 | | | | |
| First face of the ninth lens | 116.707 | 5.000 | 1.591430 | 60.6 | −0.0018 | S-BAL35 |
| Second face of the ninth lens | −150.657 | 6.000 | | | | |
| First face of the tenth lens | −45.364 | 3.500 | 1.761670 | 27.3 | 0.0133 | S-TIH4 |
| Second face of the tenth lens | −59.427 | 0.500 | | | | |
| First face of the eleventh lens | 65.995 | 5.000 | 1.620330 | 63.0 | 0.0051 | S-PHM52 |
| Second face of the eleventh lens | −202.293 | 0.500 | | | | |
| First face of the twelfth lens | 54.889 | 5.500 | 1.620330 | 63.0 | 0.0051 | S-PHM52 |
| First face of the thirteenth lens | −223.543 | 2.000 | 1.616690 | 44.0 | −0.0065 | S-NBM51 |
| Second face of the thirteenth lens | 31.631 | D23GBE | | | | |

| | | | |
|---|---|---|---|
| f [mm] | 167.3 | 334.6 | 501.9 |
| D9 [mm] | 35.773 | 76.325 | 119.468 |
| D14 [mm] | 101.408 | 42.598 | 13.255 |
| D23GBE [mm] | 110.217 | 128.476 | 114.676 |

-continued

| | | | |
|---|---|---|---|
| Entrance pupil diameter [mm] | 38.44 | 65.3 | 85.0 |
| Relative aperture | 1:4.4 | 1:5.1 | 1:5.9 |
| 2 * Sigma | 4.5° | 2.25° | 1.5° |

| | |
|---|---|
| Focal length first lens unit [mm] | 502.73 |
| Focal length first lens group [mm] | 251.95 |
| Focal length second lens group [mm] | −243.67 |
| Focal length second lens unit [mm] | −75.78 |
| Focal length third lens unit [mm] | 82.14 | wherein 2*Sigma is an aperture angle of an object side of the optical system.

15. A telescope, comprising:
   at least one image acquisition unit; and
   an objective that is implemented as an optical system, the optical system including:
      only three lens units disposed from an object in the direction of the at least one image acquisition unit, namely a first lens unit, a second lens unit, and a third lens unit,
      wherein the second lens unit and the third lens unit are movably situated along an optical axis of the optical system for zooming,
      wherein the first lens unit includes a first lens group and a second lens group only, the first lens group of the first lens unit being fixedly situated on the optical axis of the optical system, and the second lens group of the first lens unit being movably situated along the optical axis of the optical system for focusing,
      wherein the first lens group includes at least three lenses, the second lens group includes at least two lenses, and wherein the at least one image acquisition unit is a surface sensor.

16. The telescope as recited in claim 15, wherein the surface sensor is at least one of: a charge-coupled device (CCD) and a complementary metal oxide semiconductor (CMOS) sensor.

17. The telescope as recited in claim 15, further comprising:
   a prism reversal system.

18. A telescope, comprising:
   at least one image acquisition unit; and
   an objective that is implemented as an optical system, the optical system including:
      three lens units disposed from an object in the direction of the at least one image acquisition unit, namely a first lens unit, a second lens unit, and a third lens unit,
      wherein the second lens unit and the third lens unit are movably situated along an optical axis of the optical system for zooming,
      wherein the first lens unit includes a first lens group and a second lens group, the first lens group of the first lens unit being fixedly situated on the optical axis of the optical system, and the second lens group of the first lens unit being movably situated along the optical axis of the optical system for focusing,
      wherein the second lens group includes at least two lenses,
      wherein the first lens group of the first lens unit includes:
         a first lens that is a converging lens;
         a second lens that is a converging lens; and
         a third lens that is a dispersive lens,
      wherein the second lens group of the first lens unit includes:
         a fourth lens that is a converging lens; and
         a fifth lens that is a dispersive lens,
      wherein the second lens unit includes:
         a sixth lens that is a dispersive lens;
         a seventh lens that is a dispersive lens; and
         an eighth lens that is a converging lens,
      and wherein the third lens unit includes:
         a ninth lens that is a converging lens;
         a tenth lens that is a dispersive lens;
         an eleventh lens that is a converging lens;
         a twelfth lens that is a converging lens; and
         a thirteenth lens that is a dispersive lens.

19. An optical system for imaging an object on an image acquisition unit, comprising:
   only three lens units disposed from the object in the direction of the image acquisition unit, namely a first lens unit, a second lens unit, and a third lens unit,
   wherein the second lens unit and the third lens unit are movably situated along an optical axis of the optical system for zooming,
   wherein the first lens unit includes a first lens group and a second lens group only, the first lens group of the first lens unit being fixedly situated on the optical axis of the optical system, and the second lens group of the first lens unit being movably situated along the optical axis of the optical system for focusing,
   wherein the first lens group includes at least three lenses,
   wherein the second lens group includes at least two lenses, and
   wherein the second lens group is a dispersive second lens group.

20. An optical system for imaging an object on an image acquisition unit, comprising:
   only three lens units disposed from the object in the direction of the image acquisition unit, namely a first lens unit, a second lens unit, and a third lens unit,
   wherein the second lens unit and the third lens unit are movably situated along an optical axis of the optical system for zooming,
   wherein the first lens unit includes a first lens group and a second lens group only, the first lens group of the first lens unit being fixedly situated on the optical axis of the optical system, and the second lens group of the first lens unit being movably situated along the optical axis of the optical system for focusing,
   wherein the first lens group includes at least three lenses,
   wherein the second lens group includes at least two lenses,
   wherein a relative aperture of the optical system is variable, and
   wherein the image acquisition unit is a surface sensor.

* * * * *

UNITED STATES PATENT AND TRADEMARK OFFICE
CERTIFICATE OF CORRECTION

PATENT NO. : 8,873,162 B2
APPLICATION NO. : 12/586284
DATED : October 28, 2014
INVENTOR(S) : Volker Tautz It is certified that error appears in the above-identified patent and that said Letters Patent is hereby corrected as shown below:

In the Summary of the Invention: Please correct Column 4, Line 34, as follows:

$\Delta\theta \text{ g } F > 0.004$ (condition 5).

Signed and Sealed this
Twenty-seventh Day of December, 2016

Michelle K. Lee
*Director of the United States Patent and Trademark Office*